United States Patent
Piwonka et al.

(10) Patent No.: US 6,754,793 B2
(45) Date of Patent: *Jun. 22, 2004

(54) METHOD FOR FLASHING ESCD AND VARIABLES INTO A ROM

(75) Inventors: Mark A. Piwonka, Tomball, TX (US); Louis B. Hobson, Tomball, TX (US); Jeffrey D. Kane, Spring, TX (US); Randall L. Hess, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,147

(22) Filed: Dec. 16, 2002

(65) Prior Publication Data

US 2003/0088728 A1 May 8, 2003

Related U.S. Application Data

(63) Continuation of application No. 09/571,467, filed on May 16, 2000, now Pat. No. 6,505,278, which is a continuation of application No. 09/070,866, filed on Apr. 30, 1998, now Pat. No. 6,073,206.

(51) Int. Cl.[7] .............................................. G06F 13/00
(52) U.S. Cl. ........................... 711/162; 711/103; 714/6; 707/204
(58) Field of Search ................. 711/102–105, 161–162, 711/165; 714/6; 707/202–204

(56) References Cited

U.S. PATENT DOCUMENTS

| 5,339,437 A | 8/1994 | Yuen |
| 5,600,801 A | 2/1997 | Parks et al. |
| 5,608,876 A | 3/1997 | Cohen et al. |
| 5,724,027 A | 3/1998 | Shipman et al. |
| 5,737,579 A | 4/1998 | Kimura et al. |
| 5,748,940 A | 5/1998 | Angelo et al. |
| 5,781,793 A | 7/1998 | Larvoire et al. |
| 5,822,581 A | 10/1998 | Christeson |
| 5,835,933 A | 11/1998 | Wells et al. |
| 5,864,698 A | 1/1999 | Krau et al. |
| 5,913,219 A | 6/1999 | Baek et al. |
| 5,956,749 A | 9/1999 | Kakihara |
| 6,026,465 A | 2/2000 | Mills et al. |
| 6,058,455 A | 5/2000 | Islam et al. |
| 6,078,541 A | 6/2000 | Kitagawa et al. |

OTHER PUBLICATIONS

"'Preliminary' Plug and Play Bios Specification, Version 1.0A," Compaq Computer Corporation Phoenix Technologies Ltd., Intel Corporation, pp. 7–23, 57–64 (Mar. 10, 1994).

(List continued on next page.)

Primary Examiner—Nasser Moazzami

(57) ABSTRACT

A computer system for flashing Extended System Configuration Data (ESCD) and associated variables to a flash read-only memory (ROM) is provided. During Power-On-Self-Test (POST) code, a ROM image is copied from an ESCD sector of a read-only memory to an ESCD original buffer and an ESCD write buffer. The ESCD write buffer may be updated by POST code. Following the POST operations, the contents of the ESCD write buffer are copied to an ESCD runtime buffer. The contents of the ESCD original buffer or the ESCD sector are compared to the contents of the ESCD runtime buffer. If the contents of the ESCD runtime buffer differ from the contents of the compared buffer or sector, SMI code flashes the ROM image in the ESCD runtime buffer to the flash ROM. If the ESCD runtime buffer is the same as the contents of the compared buffer or sector, a ROM flash it not performed. POST is then exited and the computer system is booted. During runtime, if a write is performed to ESCD data or an associate variable, the ESCD runtime buffer is updated with the ESCD data or variable provided for the write operation. The SMI code then flashes the ROM image in the ESCD runtime buffer into the ESCD sector to save the ESCD data or variable provided by the write operation.

19 Claims, 3 Drawing Sheets

OTHER PUBLICATIONS

"Extended System Configuration Data Specification, Version 1.02," Compaq Computer Corporation, Intel Corporation, Phoenix Technologies Ltd., Copyright 1993, pp. 1–33 (Feb. 14, 1994).

"Am29IF002T/Am29F002B, 2 Megabit (262, 144 × 8–Bit) CMOS 5.0 Volt–only, Sector Architecture Flash Memory," Advanced Micro Devices, Inc., pp. 1–34 (Copyright 1996).

"Pentium™ Processor's User's Manual, vol. 3: Architecture and Programming Manual," Intel Corporation, pp. 20.1–20.9 (1996).

"Intel486™ SL Microprocessor SuperSet Programmer's Reference Manual," Intel Corporation, pp. 6.28–6.53 (Nov. 1992).

METHOD FOR FLASHING ESCD AND VARIABLES INTO A ROM

CROSS-REFERENCE TO RELATED APPLICATIONS

This application is a continuation of U.S. application Ser. No. 09/571,467, filed May 16, 2000, now U.S. Pat. No. 6,505,278, which is a continuation of U.S. application Ser. No. 09/070,866, filed Apr. 30, 1998, now U.S. Pat. No. 6,073,206, which are incorporated herein by reference in their entirety.

BACKGROUND OF THE INVENTION

DESCRIPTION OF THE RELATED ART

In order to support the automatic configuration of Plug and Play devices on platforms that include a standard expansion bus, non-volatile storage such as CMOS RAM, ROM, or NVRAM is used to store information about system resources used by non-Plug and Play devices in a computer system. This configuration information is typically stored in an Extended System Configuration Data (ESCD) format. The ESCD format accommodates storage of configuration information for Plug and Play devices and non-Plug and Play devices. ESCD generally allows Plug and Play System Basic Input Output Services (BIOS) code to more fully configure a computer system at power up by specifying the system resources assigned to devices that have been installed in the system. The portion of non-volatile storage used to store the ESCD may be only a subset of the total non-volatile storage available in a computer system.

System BIOS code is used by the operating system to read or write ESCD as the non-volatile storage storing ESCD has traditionally resided in the system BIOS memory space. Accordingly, only system BIOS has known the location of the ESCD in the non-volatile storage and the proper method for accessing the non-volatile storage. If the non-volatile storage is memory-mapped, the physical base address of the memory mapped non-volatile storage allows a "caller," such as an operating system, to construct a segment descriptor pointed to by a memory pointer known as a segment selector. If a function to read or write ESCD is called from a protected mode, the segment descriptor is created from a protected mode base segment address typically termed an ESCD Selector parameter. If a function to read or write ESCD is called from real mode, a segment descriptor is created from a real mode base segment address typically termed a BIOS Selector parameter. A segment selector serves as a pointer to a segment descriptor for an ESCD area of non-volatile storage. In addition, a function to read or write ESCD generates a pointer to the size of ESCD for determining an entry point into the ESCD. A function to read ESCD transfers ESCD from an ESCD area of non-volatile storage to a memory buffer typically having a pointer termed ESCD Buffer, and a function to write ESCD transfers data from the memory buffer to an ESCD area of non-volatile storage. ESCD functions are further described in the Extended System Configuration Data Specification, Version 1.02, published on Feb. 14, 1994, by Compaq Computer Corporation, Intel Corporation, and Phoenix Technologies, Ltd.

ESCD may be updated during a Power-On-Self-Test (POST) or at runtime. For example, ESCD may be updated by POST if POST detects that a new Plug and Play bootable device is added-to the computer system. ESCD information may be used by POST to allocate system resources to all configurable devices that are known to the system BIOS. System resources typically include Direct Memory Access (DMA) channels, Interrupt Request Lines (IRQs), Input/Output (I/O) addresses, and memory. ESCD also may be updated during runtime by system software in order to effect configuration of devices on the next boot. An ESCD interface provides a mechanism for allowing system software to lock system resources allocated to specific devices in the system and thereby avoid system resource conflicts.

Updating ESCD in a conventional computer system has been dependent upon a segment selector from an operating system. The segment selector used by system BIOS to address an ESCD area of non-volatile storage is generated by the operating system. As a segment selector is exclusively configured for the memory map of the operating system, a segment selector loses meaning outside the context of the operating system memory map. A segment selector provided by an operating system also must be configured for the particular operating mode—real mode, 16-bit protected mode, or 32-bit protected mode—whichever is applicable. The segment selector in one operating mode is therefore different from the segment selector for another operating mode. Further, the need for a segment selector from an operating system to update ESCD has required a different selector if an ESCD area is relocated. Another drawback of using a segment selector from an operating system to read or write ESCD is the need to use a relatively slow bus within a computer system to reach the ESCD area of non-volatile storage.

ESCD has typically resided in a portion of a ROM treated as an option ROM. Option ROM represents a designated area of ROM space which an operating system preferably is programmed not to utilize. In certain operating modes, however, availability of an option ROM is not guaranteed. For example, during runtime in a 32-bit protected mode, an operating system may not provide a segment selector to an option ROM, thereby preventing access to the option ROM during runtime. In addition, the size of the ROM space for which an operating system provides a segment selector is limited.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
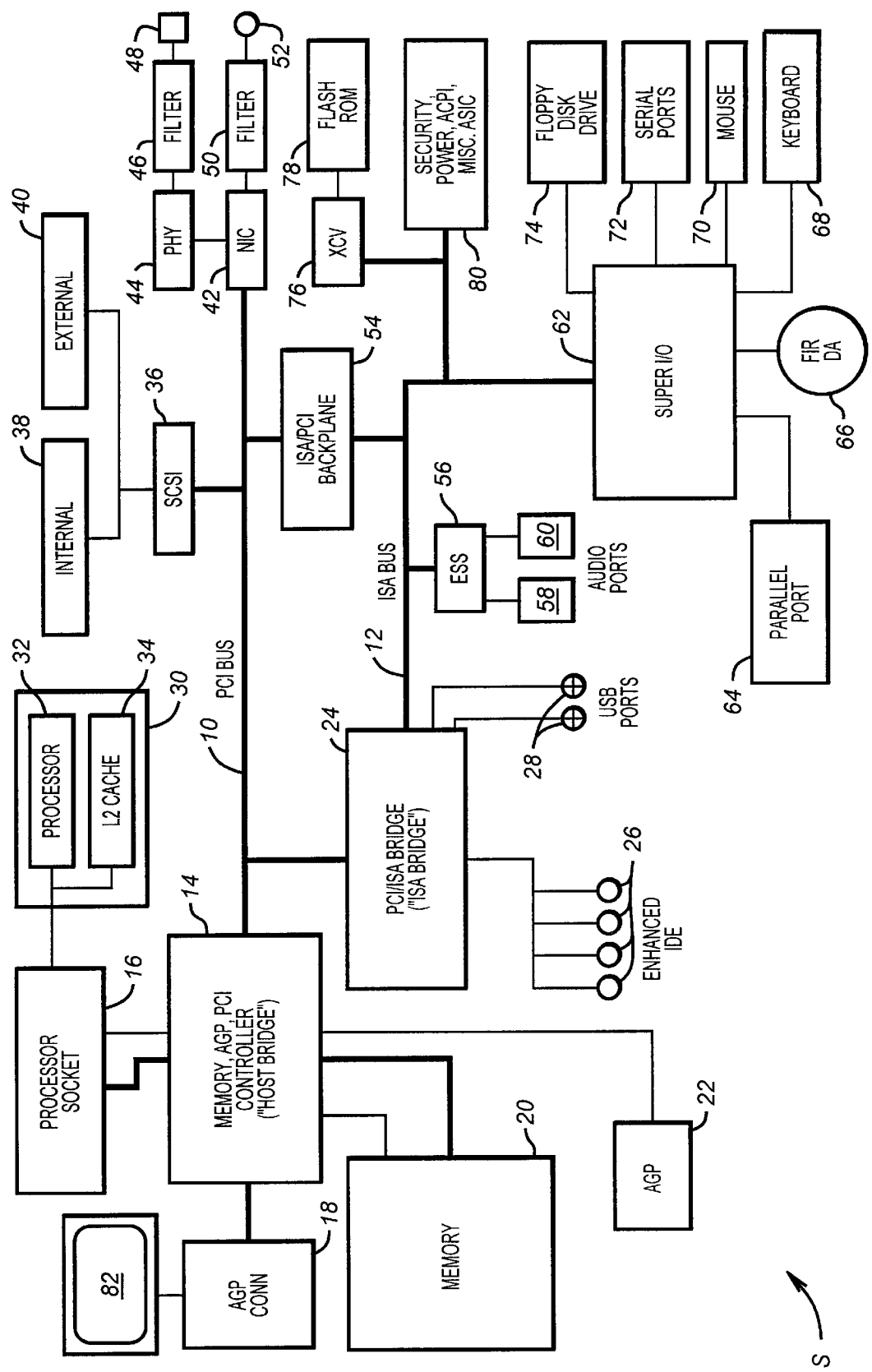
FIG. 1 is a schematic diagram of a computer system including a flash ROM.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte couple metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit (I2C) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is an AIC-7860 SCSI controller. Also coupled to the PCI bus 10 is a network interface controller (NIC) 42, which preferably supports the ThunderLanTN power management specification by Texas Instruments. The NIC 42 is coupled through a physical layer 44 and a filter 46 to an RJ-45 jack 48, and through a filter 50 to an AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement. The flash ROM 78 includes an ESCD sector for storing ESCD and associated variables. Details concerning ESCD may be obtained from the Extended System Configuration Data Specification, Version 1.02, published on Feb. 14, 1994 by Compaq Computer Corporation, Intel Corporation, and Phoenix Technologies, Ltd.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. Finally, a video display 82 can be coupled to the AGP connector 18 for display of data by the computer system S. Again, a wide variety of systems could be used instead of the disclosed system S without detracting from the spirit of the invention.

Figure 2:
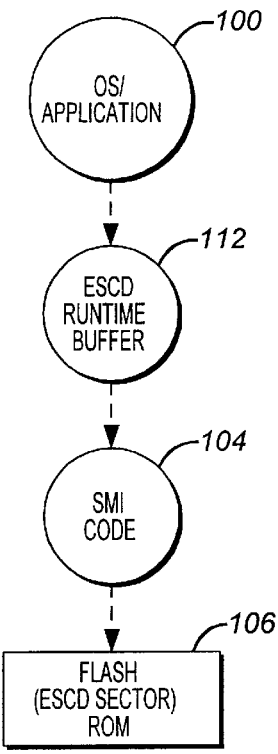
FIG. 2 is a data flow diagram of an ESCD flash process in accordance with the present invention.
Figure 3:
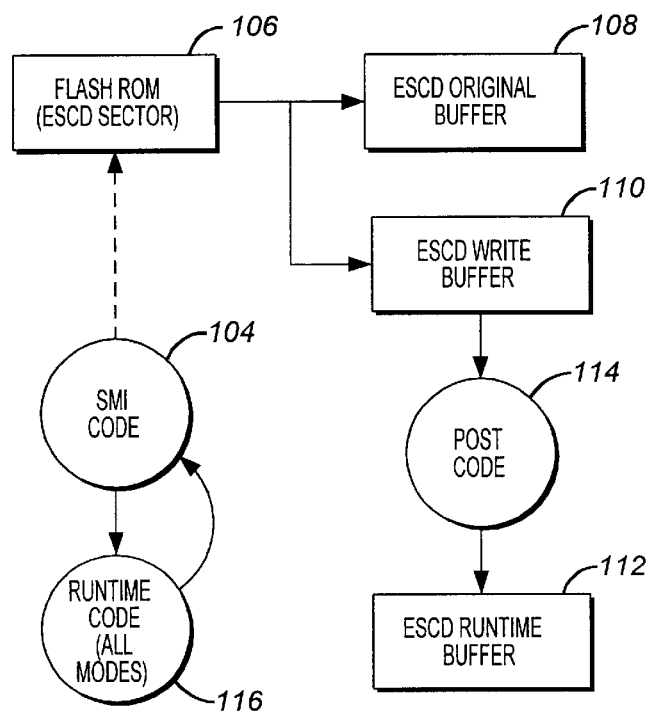
FIG. 3 is a data flow diagram of an ESCD flash process using an ESCD original buffer, ESCD write buffer, and ESCD runtime buffer in accordance with the present invention.

Referring to FIG. 2, a data flow diagram of an ESCD flash process in accordance with the present invention is shown. An operating system or application 100 may initiate an update of the ESCD sector 106 so as to store data to ESCD or associated variables. The operating system 100 for example may call ROM BIOS code to be executed by the processor 32 for performing an update of the ESCD sector 106 (FIGS. 2 & 3). In accordance with the present invention, an update related to the ESCD sector 106 is achieved by copying data to an ESCD runtime buffer 112 during runtime or POST (Power-On-Self-Test). POST is designed to identify, test, and configure the computer system S in preparation for starting the operating system. During late POST, data associated with the ESCD sector 106 may be copied to an ESCD write buffer 110 (FIG. 3). The set of operations collectively termed the POST operations are of the conventional type known in the art. During late POST, the contents of the ESCD write buffer 110 may be copied to the ESCD runtime buffer 112. In the disclosed embodiment, data is copied a byte at a time. If the ESCD runtime buffer 112 has been updated, runtime code 116 (FIG. 3) generates a System Management Interrupt (SMI) so as to pass the ROM image contained in the ESCD runtime buffer 112 to SMI code 104. In the disclosed embodiment, the SMI code 104 is initially stored in the flash ROM 78 and copied to a volatile memory area during boot-up of the computer system S. The SMI code 104 flashes the ROM image to the ESCD sector 106 of the flash ROM 78. The SMI code 104 includes an algorithm for flashing the ESCD sector 106 which is specific to the particular flash ROM 78. An algorithm for flashing a flash ROM typically includes an erase sequence for erasing a flash ROM followed by a programming sequence for programming a flash ROM.

Figure 4:
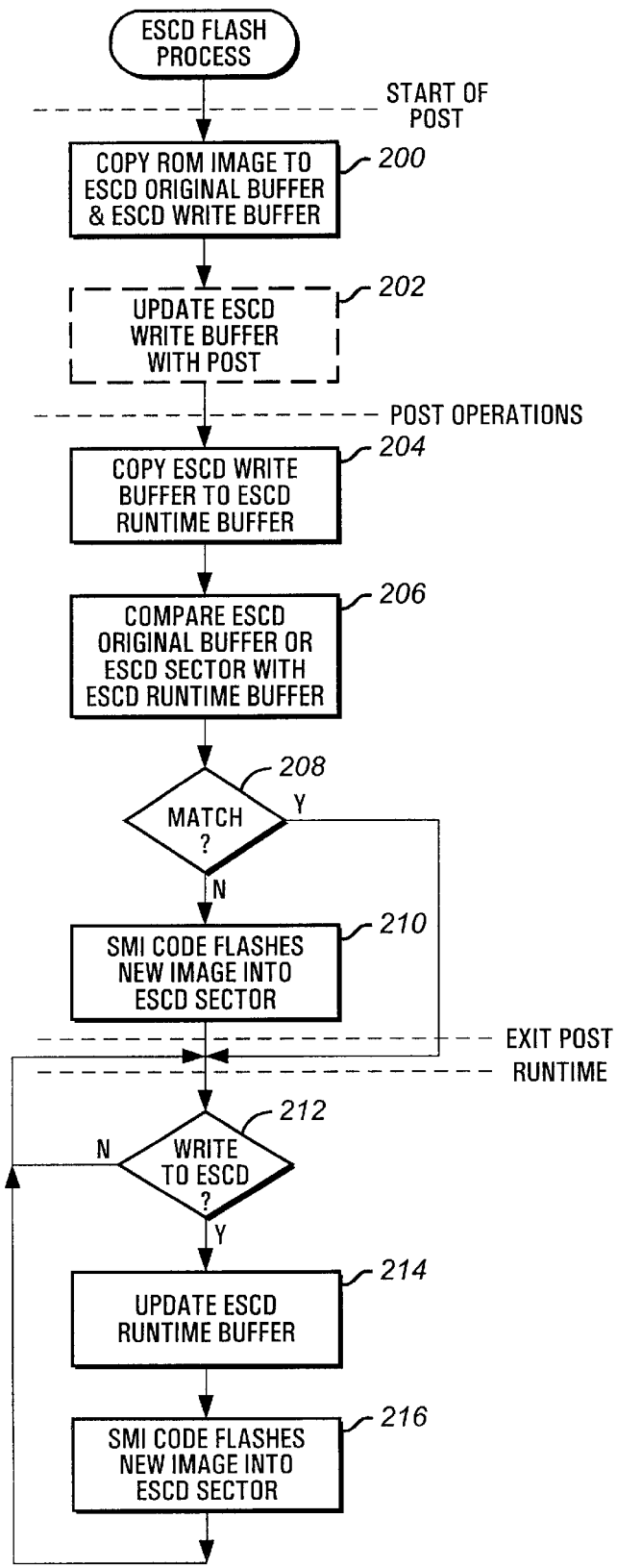
FIG. 4 is a flowchart of the ESCD flash process of FIG. 3.

Referring to FIG. 3, a data flow diagram of an ESCD flash process using an ESCD original buffer 108, the ESCD write buffer 110, and an ESCD runtime buffer 112 in accordance with the present invention is shown. In accordance with the present invention, the flash ROM 78 includes the ESCD sector 106, POST code 114, SMI code 104 for flashing a ROM image into the ESCD sector 106, and code for executing the ESCD flash process. Referring to FIG. 4, a flowchart of the ESCD flash process of FIG. 3 is shown. Following boot-up of the computer system S, POST is initiated. Beginning at step 200, a ROM image of the ESCD sector 106 is copied to the ESCD original buffer 108 and the ESCD write buffer 110. The ESCD original buffer 108 serves to maintain the original ROM image of the ESCD sector 106. Next, in step 202, the ESCD write buffer 110 may or may not be updated by POST. Step 202 is shown in broken line to reflect that the step is optional. If performed, step 202 is typically followed by a POST operation.

From either step 202 or 200, control proceeds to step 204 of the POST operation wherein the contents of the ESCD write buffer 110 are copied to the ESCD runtime buffer 112 during POST 114. Next, in step 206, either the ESCD original buffer 108 or the ESCD sector 106 is compared to the ESCD runtime buffer 112. The ESCD original buffer 108 contains a ROM image of the ESCD sector 106. The ESCD original buffer 108, ESCD write buffer 110, or the ESCD sector 106 may be used to determine if the ESCD sector 106 has been updated. Since the ESCD original buffer 108 is a random access memory area, accessing the ESCD original buffer 108 is faster than accessing the ESCD sector 106.

Control then proceeds to step 208 wherein it is determined if the ESCD runtime buffer 112 matches the compared buffer or sector. If the ESCD runtime buffer 112 does not match the compared buffer or sector, then control proceeds to step 210 wherein the SMI code 104 flashes the ROM image in the ESCD runtime buffer 112 into the ESCD sector 106. A mismatch between the ESCD runtime buffer 112 and the compared buffer or sector indicates that the ESCD runtime buffer 112 has been updated. If the ESCD runtime buffer 112 matches the compared buffer or sector, control proceeds to step 212. A match between the ESCD runtime buffer 112 and the compared buffer or sector indicates that the ESCD runtime buffer 112 has not been updated.

From step 210, control proceeds to step 212. Following step 208 or 210, POST is exited and runtime begins. At step 212, it is determined whether there is a write to ESCD data or associated variables. ESCD data and associated variables may change during runtime. If a write to ESCD data or associated variables is detected, control proceeds from step 212 to step 214. In step 214, the ESCD runtime buffer 112 is updated with the data written to ESCD or associated variables. The ESCD data or associated variables written may be new data or may be the same as previously stored data. Alternatively, it is contemplated that the ESCD runtime buffer 112 may be exclusively updated when a write of new ESCD data or associated variables is detected. From step 214, control proceeds to step 216 wherein the SMI code 104 flashes the ROM image in the ESCD runtime buffer 112 into the ESCD sector 106. This step is performed during a system management mode of the computer system S. From step 216, control returns to step 212. In this way, any write to ESCD or associated variables during runtime results in flashing a new ROM image into the ESCD sector 106.

The use of the ESCD write buffer 110 and the ESCD runtime buffer 112 serves to isolate storage of ESCD and associated variables during POST from storage of ESCD and associated variables during runtime. The ESCD original buffer 108 and ESCD write buffer 110 both serve as ESCD POST buffers. The ESCD original buffer 108 maintains the original ROM image of the ESCD sector 106, and the ESCD write buffer 110 reflects any updates to ESCD data and associated variables during POST. In the disclosed embodiment, the ESCD original buffer 108 and ESCD write buffer 110 are random access memory areas existing during POST. Further, in the disclosed embodiment, the ESCD runtime buffer 112 is a random access memory area existing during late POST and runtime. It should be understood that the ESCD buffers and the ESCD sector described store both ESCD data and associated variables.

In the disclosed embodiment, the associated variables include variables representing system features and ownership data. Specifically, the ownership data variables may include an ownership tag, a chassis serial number and manufacturing process numbers bytes. Use of an ownership tag, chassis serial number, and manufacturing process number bytes are conventional and known in the art. The ownership tag may be an 80-byte standard ASCI character string protected by an administrator password. In the disclosed embodiment, the specific ownership tag used is, for example, "Property of _____," the particular vendor of the system S. An ownership tag is typically displayed during POST. Manufacturing process number bytes are used to track the last station of a manufacturing line which the computer system has been through.

In a conventional computer system, a segment selector from an operating system is used to locate ESCD. The segment selector provided by the operating system is configured for the particular operating mode—real mode, 16-bit protected mode, 32-bit protected mode—whichever is applicable. A segment selector in one operating mode is therefore different from a segment selector for another operating mode. Also, ESCD has typically resided in a portion of a ROM treated as an option ROM. In certain operating modes, however, availability of an option ROM is not guaranteed. For example, during runtime in a 32-bit protected mode, an operating system may not provide a segment selector to an option ROM, thereby preventing access to the option ROM during runtime. In accordance with the flash process of the present invention, a flash may be performed in any operating mode since there is no operating system intervention. Using SMI code in accordance with the present invention thus provides for flashing a non-volatile memory independent of the operating mode of the computer system.

Further, in a conventional computer system, updating ESCD has required accessing the non-volatile memory storing ESCD. The need to access a non-volatile memory each time ESCD is updated requires the transfer of ESCD across a relatively slow bus coupled to the non-volatile memory. In accordance with the present invention, a ROM image is flashed from the ESCD runtime buffer 112. Accessing a random access memory area of the ESCD runtime buffer 112 as opposed to the ESCD sector 106 increases POST execution time since the ESCD runtime buffer 112 may be accessed without providing data across a relatively slow bus.

It should be understood that the flash process of the present invention may extend to areas of a non-volatile memory other than the ESCD sector. In accordance with the present invention, SMI code may be used to flash any area of the non-volatile memory. Further, it should be understood that a stack, pointers, and registers may be used in copying contents from one ESCD buffer to another ESCD buffer. It should also be understood that the flash process in accordance with the present invention encompasses flashing any non-volatile memory and therefore is not limited to flashing a read-only-memory.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of updating data in a computer system, the method comprising the steps of:
    detecting an update to a primary volatile memory data buffer;
    signaling a system management interrupt (SMI) responsive to the detecting step; and
    flashing updated data in the primary volatile memory data buffer to a non-volatile memory responsive to the SMI, independently of an operating mode of the computer system, the computer system having multiple operating modes.

2. The method of claim 1, the detecting step comprising the step of:
    detecting an update to the primary volatile memory data buffer before the computer system is booted.

3. The method of claim 1, the detecting step comprising the step of:
    detecting an update to the primary volatile memory data buffer during runtime of the computer system.

4. The method of claim 1, the detecting step comprising the steps of:
    comparing the primary volatile memory data buffer and a data storage area of the non-volatile memory; and
    detecting a mismatch between the primary volatile memory data buffer and the data storage area.

5. The method of claim 1, the detecting step comprising the steps of:
    copying data in a data storage area of a non-volatile memory to a secondary volatile memory data buffer;
    comparing the secondary volatile memory data buffer and the primary volatile memory data buffer; and
    detecting a mismatch between the secondary volatile memory data buffer and the primary volatile memory data buffer.

6. The method of claim 1, wherein the non-volatile memory is a flash read-only memory.

7. A computer system, comprising:
    a means for detecting an update to a primary volatile memory data buffer; and
    a system management interrupt (SMI) means for flashing updated data in the primary volatile memory data buffer to a non-volatile memory independently of an operating mode of the computer system, the computer system having multiple operating modes.

8. The computer system of claim 7, the means for detecting an update to the primary volatile memory data buffer comprising:
    a means for comparing the primary volatile memory data buffer and a data storage area of the non-volatile memory; and
    a means for detecting a mismatch between the primary volatile memory data buffer and the data storage area.

9. The computer system of claim 7, the means for detecting an update to the volatile memory data buffer comprising:
    a means for copying data in non-volatile memory to a secondary volatile memory data buffer;
    a means for comparing the secondary volatile memory data buffer and the primary volatile memory data buffer; and
    a means for detecting a mismatch between the secondary volatile memory data buffer and the primary volatile memory data buffer.

10. The computer system of claim 7, wherein the non-volatile memory comprises a flash read-only memory.

11. A computer system, comprising:
    a processor having a plurality of operating modes and an interrupt mode independent of the plurality of operating modes;
    a non-volatile memory coupled to the processor; and
    a volatile memory coupled to the processor, comprising:
        a primary volatile memory data buffer; and
        an interrupt handler storage area, storing an executable code executed responsive to an interrupt, the executable code comprising:
            code to flash updated data in the primary volatile memory data buffer to the non-volatile memory, executable in the system management mode,
    wherein the interrupt is signaled upon detection of an update to the primary volatile memory data buffer.

12. The computer system of claim 11, the interrupt handler executable code copied from the non-volatile memory when the computer system is booted.

13. The computer system of claim 11, wherein the interrupt is a system management interrupt.

14. The computer system of claim 11, the volatile memory further comprising:
    a secondary volatile memory data buffer,
    wherein the secondary volatile memory data buffer is compared to the primary volatile memory data buffer to detect an update the primary volatile memory data buffer.

15. The computer system of claim 14, wherein the secondary volatile memory data buffer contains a copy of a data storage area of the non-volatile memory buffer.

16. The computer system of claim 11, wherein the primary volatile memory data buffer contains a copy of a data storage area of the non-volatile memory buffer prior to the update to the primary volatile memory data buffer.

17. The computer system of claim 11, wherein the interrupt mode is a system management interrupt mode, and wherein the interrupt is a system management interrupt.

18. The computer system of claim 11, wherein the primary volatile memory data buffer contains Extended System Configuration Data (ESCD) format data.

19. The computer system of claim 11,
    the non-volatile memory buffer comprising:
        a first data storage area; and
        a second data storage area;
    the code to flash updated data comprising:
        code to flash updated data in the primary volatile memory data buffer to a first data storage area of the non-volatile memory.

* * * * *